(12) United States Patent
Chang (10) Patent No.: US 8,622,259 B2
(45) Date of Patent: Jan. 7, 2014

(54) ELECTRICAL VALVE CONTROL DEVICE

(76) Inventor: Hsu-Hui Chang, New Taipei (TW)

( * ) Notice: Subject to any disclaimer, the term of this patent is extended or adjusted under 35 U.S.C. 154(b) by 22 days.

(21) Appl. No.: 13/441,920

(22) Filed: Apr. 9, 2012

(65) Prior Publication Data

US 2013/0264361 A1 Oct. 10, 2013

(51) Int. Cl.
*B67D 3/00* (2006.01)

(52) U.S. Cl.
USPC ............................................. 222/504

(58) Field of Classification Search
USPC ............... 222/402.1, 402.13–402.15, 402.21, 222/402.23, 504
See application file for complete search history.

(56) References Cited

U.S. PATENT DOCUMENTS

| | | | |
|---|---|---|---|
| 3,228,562 A * | 1/1966 | Brown | 222/647 |
| 5,531,344 A * | 7/1996 | Winner | 222/1 |
| 6,041,967 A * | 3/2000 | Ganzeboom | 222/82 |
| 7,320,418 B2 * | 1/2008 | Sassoon | 222/649 |
| 7,360,674 B2 * | 4/2008 | Sassoon | 222/649 |
| 7,878,371 B2 * | 2/2011 | Sassoon | 222/52 |
| 7,954,667 B2 * | 6/2011 | Furner et al. | 222/52 |
| 8,342,365 B2 * | 1/2013 | Snodgrass | 222/63 |
| 8,381,951 B2 * | 2/2013 | Helf et al. | 222/504 |
| 8,387,827 B2 * | 3/2013 | Helf et al. | 222/52 |
| 8,469,244 B2 * | 6/2013 | Helf et al. | 222/645 |

* cited by examiner

*Primary Examiner* — Paul R Durand
*Assistant Examiner* — Donnell Long
(74) *Attorney, Agent, or Firm* — Leong C. Lei (57) ABSTRACT

The electrical valve control device contains a cover member and a base member joined together. A motor is joined to the cover member's outer surface, and its axle configured with an axial gear threads through the cover member. A transmission gear having a track engages the axial gear. A valve assembly has a nozzle, a plug tube, and a channel connected to the plug tube at one end. The other end of the channel is an open end and is in the same space as the nozzle. A cover piece is positioned in front of the open end of the channel, and is joined to a first end of a shaft threading through a helical spring. A second end of the shaft is connected to an end of a lever. A pin is extended from the second end of the lever and is embedded in the transmission gear's track.

8 Claims, 9 Drawing Sheets

FIG.1

PRIOR ART

ELECTRICAL VALVE CONTROL DEVICE

TECHNICAL FIELD OF THE INVENTION

The present invention is generally related to aerosol or liquid sprayers or spray cans such as air fresheners, deodorizers, etc., and more particular to an electrical valve control device for application to such an aerosol or liquid sprayer.

DESCRIPTION OF THE PRIOR ART

Figure 1:
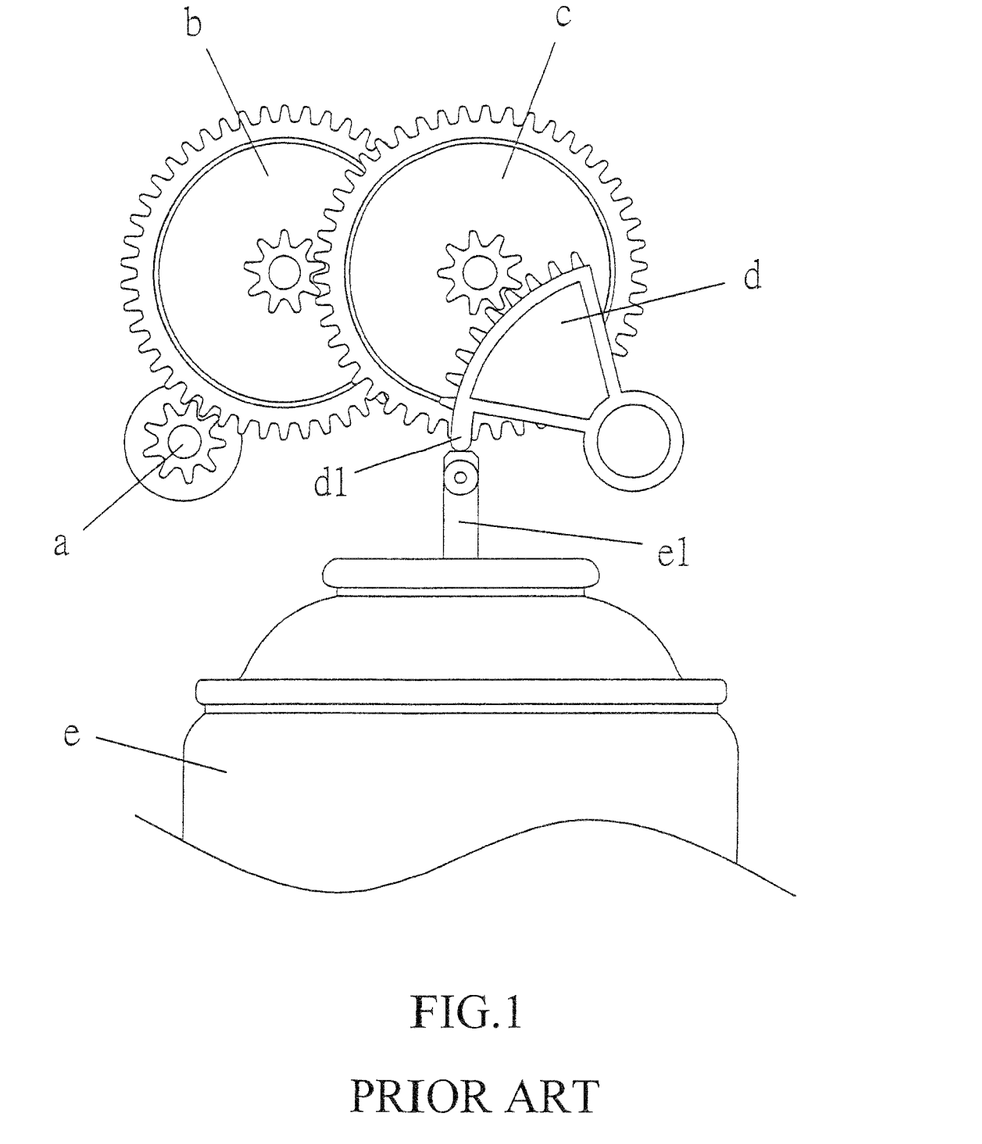
FIG. 1 is a schematic diagram showing a conventional automatic sprayer.

The engagement of a conventional automatic sprayer e, as shown in FIG. 1, mainly involves a motor's axle a, a first transmission gear b, a second transmission gear c, and a fan-shaped gear d having an extension d1 at an end of its circumferential arc. The extension d1 is positioned right above a nozzle e1 of the sprayer e.

After the motor is activated and through the first and second transmission gears b and c, the fan-shaped gear d swings downward and the extension d1 pushes the nozzle e1. As such, the content inside the sprayer e is sprayed through the nozzle e1. After the motor stops, the nozzle e1 restores itself and raises the fan-shaped gear d, so as to wait for its next engagement. Alternatively, the motor is reversed by a control circuit so that the fan-shaped gear d is restored to its original position.

The above design can indeed achieve the engagement of the sprayer. However, the design cannot control how much is sprayed from the sprayer. Usually this is achieved by a valve beneath the nozzle e1 that will be closed when a certain amount of spray is reached. Then, even though the nozzle e1 is still pressed, no more spray is delivered. The disadvantage is that the cost of the valve has to be bore by the sprayer manufacturer.

SUMMARY OF THE INVENTION

Therefore, a major objective of the present invention is to provide a novel electrical valve control device for a sprayer that is easy to assembly, convenient to use, and inexpensive to manufacture.

To achieve the objective, the electrical valve control device contains a cover member and a base member that are matched and joined together. A motor is joined to the outer surface of the cover member. The motor's axle is configured with an axial gear and threads through the cover member. A transmission gear having a track around its axle engages the axial gear. A valve assembly has a nozzle and a plug tube pointing at opposite directions. The valve assembly further has a channel perpendicular to and connected to the plug tube at one end. The other end of the channel is an open end and is in the same space as the nozzle. A cover piece is positioned in front of the open end of the channel. The cover piece is joined to a first end of a shaft threading through a helical spring. A second end of the shaft is connected to a first end of a lever. A pin is extended from the second end of the lever and is embedded in the transmission gear's track. As such, the transmission gear drives the lever which in turn engages the shaft so that the cover piece is moved away from the channel.

Preferably, the track on the transmission gear is a spiral track.

Preferably, a ring is configured at the second end of the lever that surrounds the axle of the transmission gear.

Preferably, a fastening ring is plugged into the plug tube, and the plug tube and the fastening ring are altogether threaded into a joining tube.

Preferably, two positioning beams are extended from an outer surface of the cover member, each positioning beam has a hook at a top end, and the two positioning beams jointly fasten the motor to the outer surface of the cover member.

Preferably, a pin is configured on an inner surface of the cover member for the axially mounting of the transmission gear.

Preferably, two openings are configured on the cover and base members at corresponding locations, respectively, so as to allow the nozzle and the joining tube of the valve assembly to thread through.

Preferably, an L-shaped tube is configured on the nozzle so as to alter the direction of spray.

The advantages of the present invention over the prior art are as follows.

First, the amount of spray is controlled by the duration of the cover piece's opening the channel, which is in turn controlled by the up and down movement of the lever's ring as the motor's axial gear drives the transmission gear as well as the spiral track.

Secondly, with an L-shaped tube mounted on the nozzle, the spray direction can be altered and adjusted.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 2:
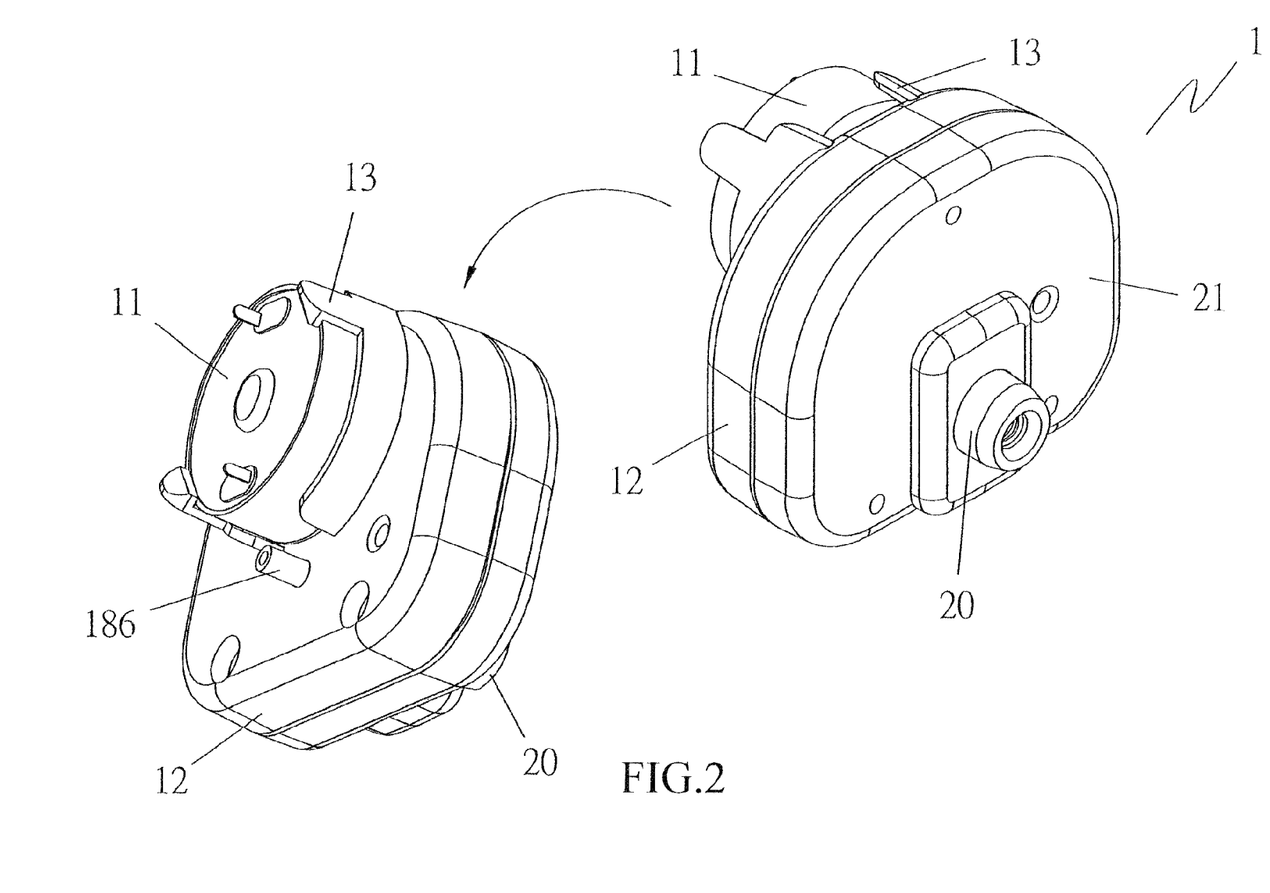
FIG. 2 is a perspective diagram showing an electrical valve control device according an embodiment of the present invention.
Figure 3:
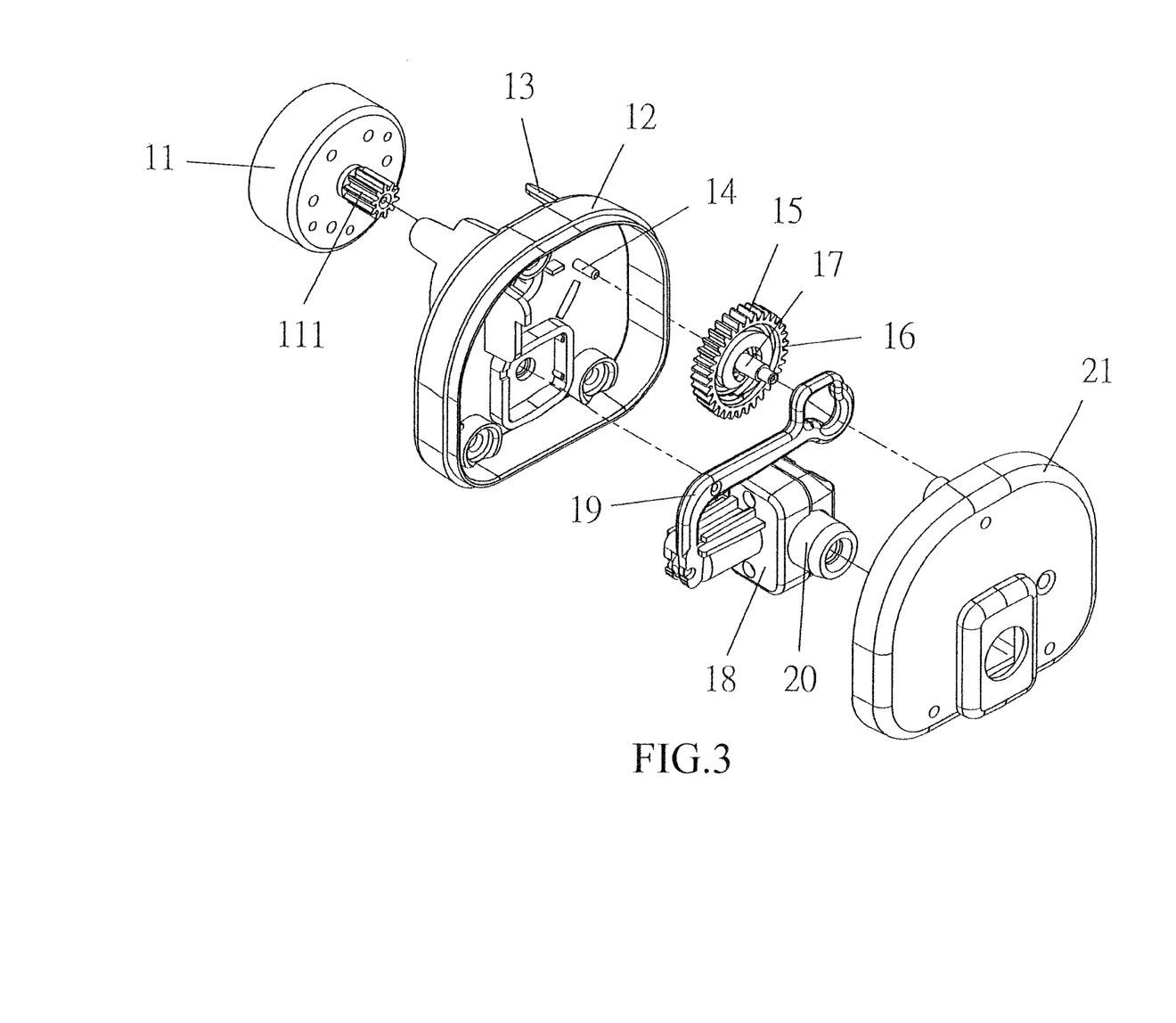
FIG. 3 is a perspective break-down diagram showing the various components of the electrical valve control device of FIG. 2.
Figure 4:
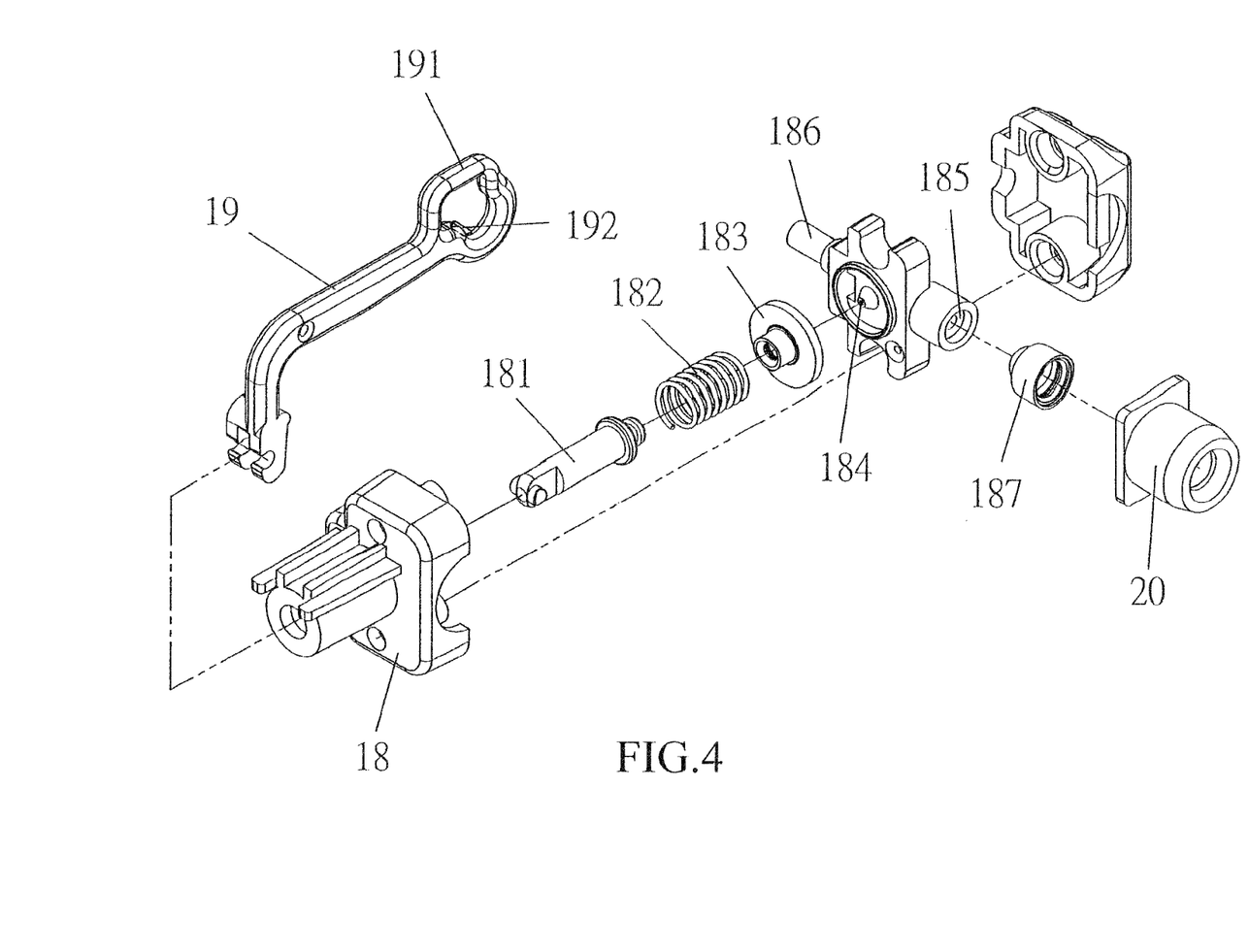
FIG. 4 is perspective break-down diagram showing the various components of a valve assembly of the electrical control device of FIG. 2.
Figure 5:
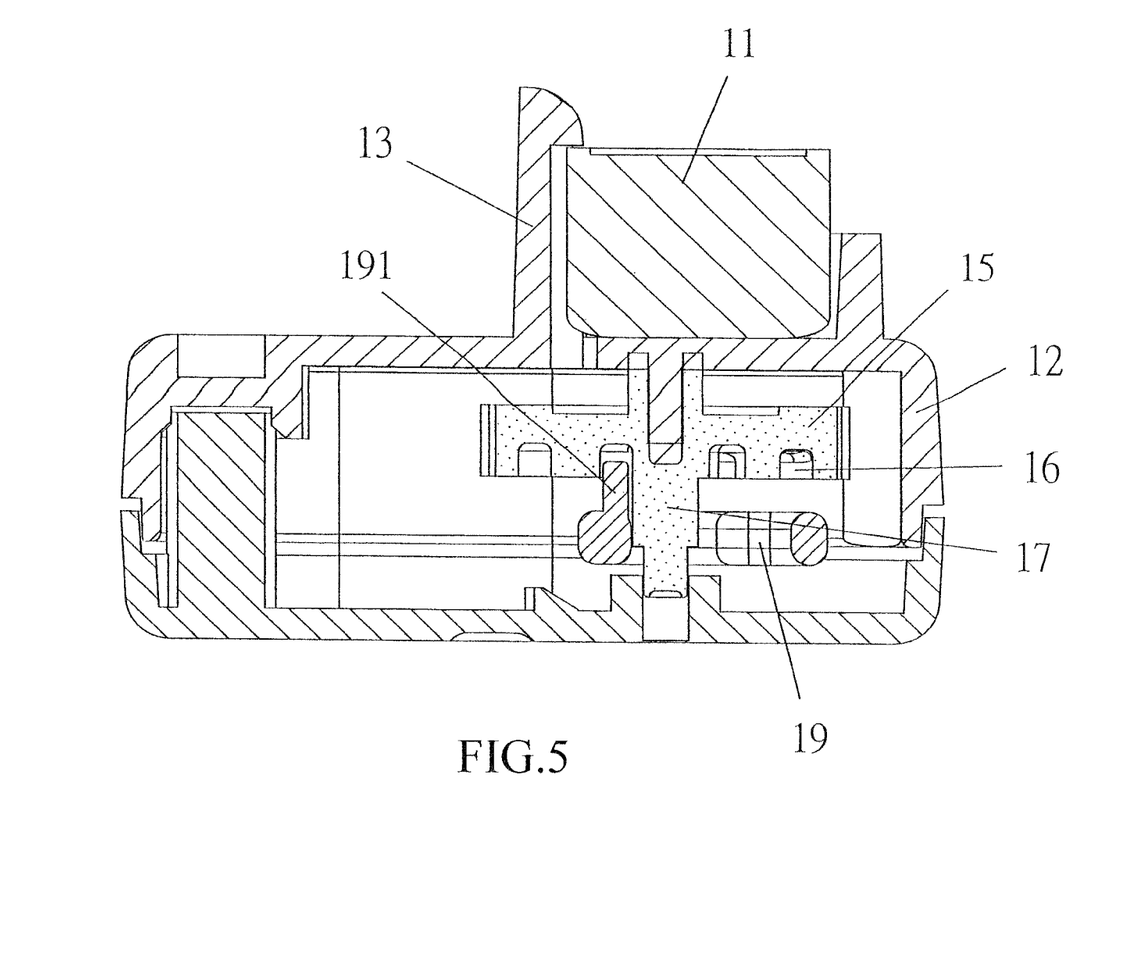
FIG. 5 is a sectional diagram showing the electrical valve control device of FIG. 2.
Figure 6:
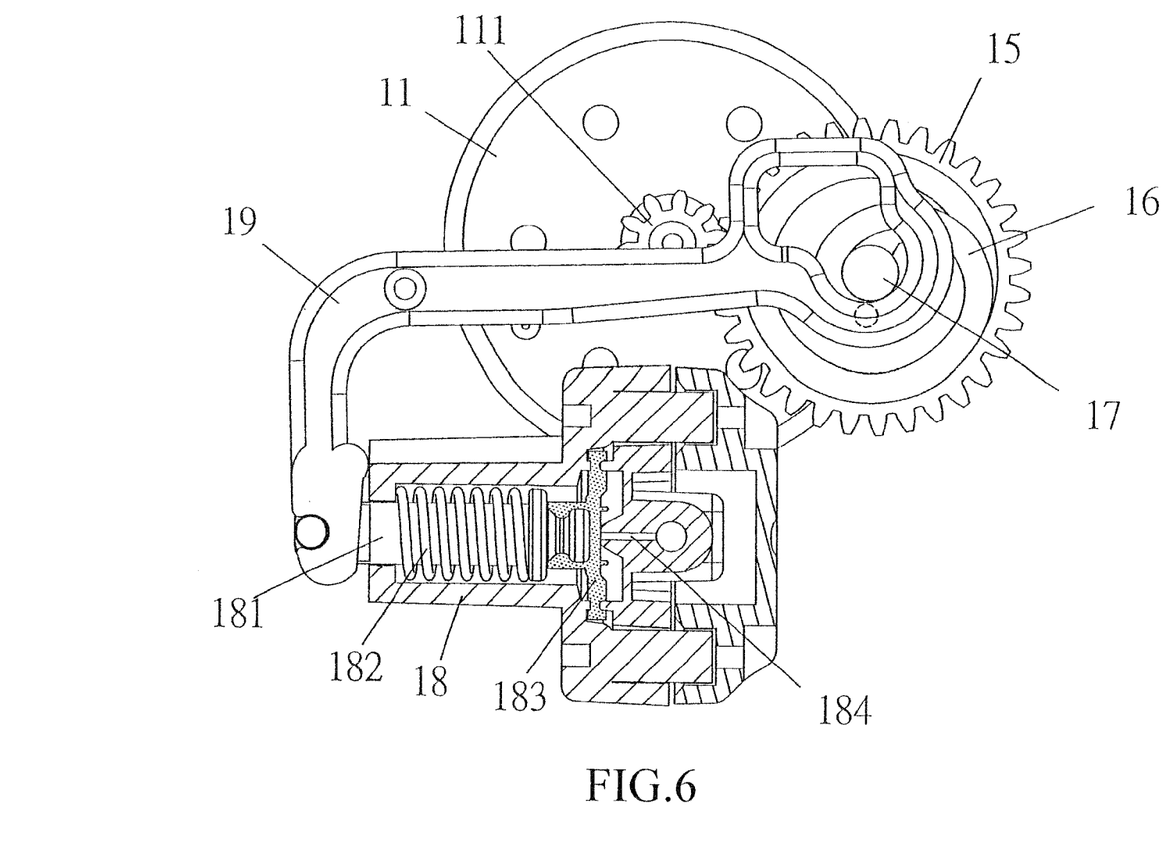
FIG. 6 is a cross-sectional diagram showing the electrical valve control device of FIG. 2.
Figure 7:
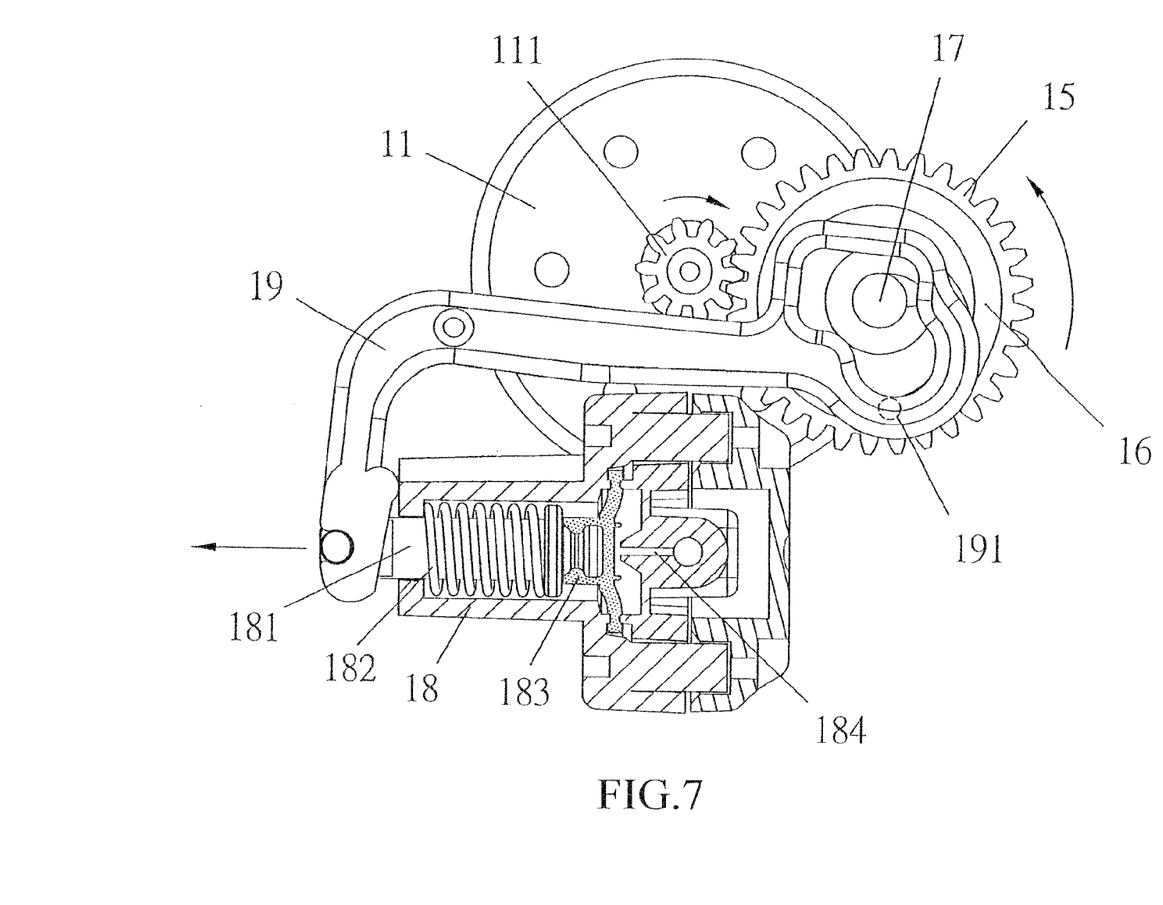
FIG. 7 is a cross-sectional diagram showing an operation scenario of the electrical valve control device of FIG. 2.
Figure 8:
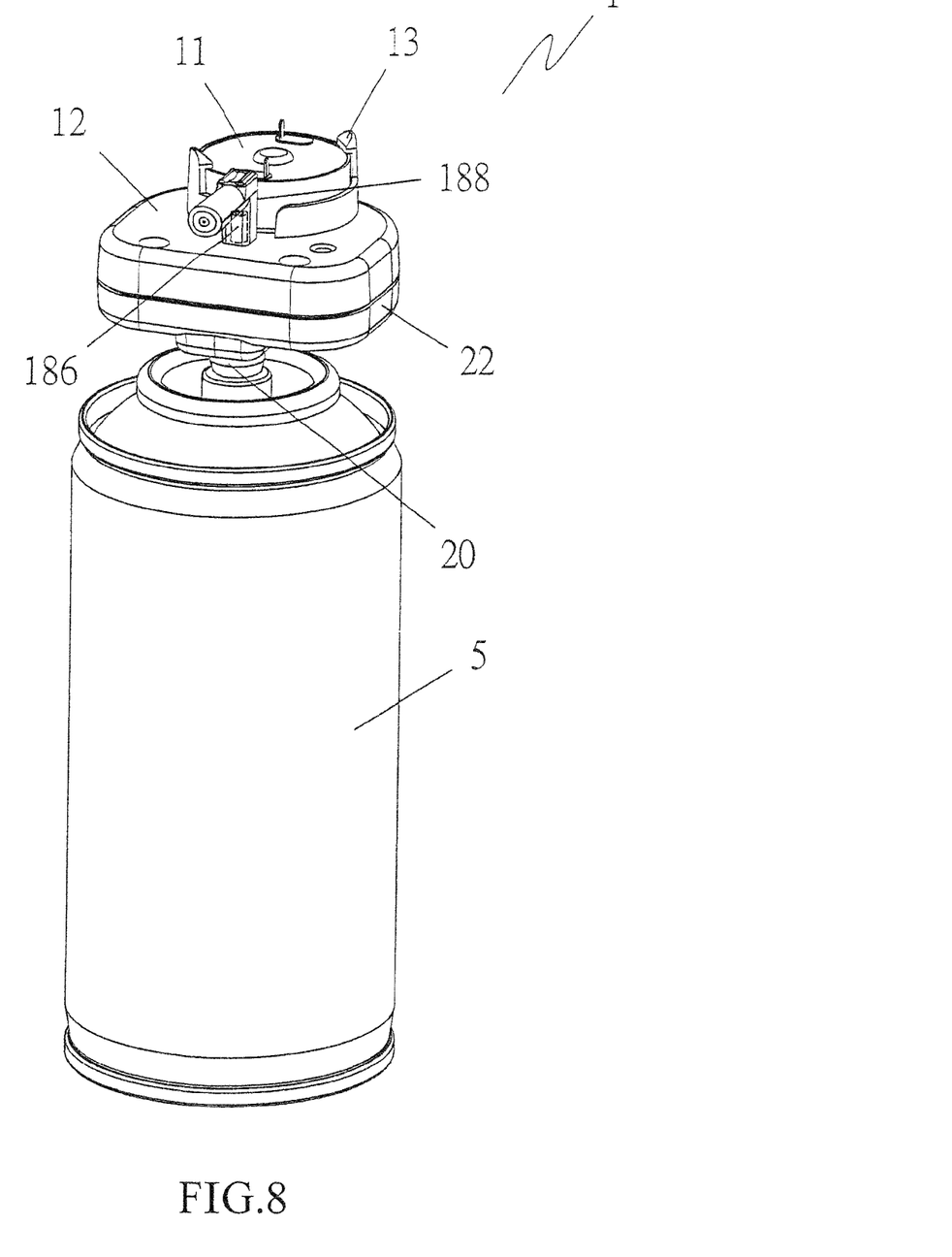
FIG. 8 is a perspective diagram showing the electrical valve control device of FIG. 2 mounted on a sprayer.

As shown in FIGS. 2 and 3, an electrical valve control device 1 according to an embodiment of the present invention contains a cover member 12 and a base member 21 that are matched and joined together. Two positioning beams 13 are extended from an outer surface of the cover member 12. Each positioning beam 13 has a hook at a top end and the two positioning beams 13 jointly fasten a motor 11 to the outer surface of the cover member 12. The cover member has a through hole surrounded by the positioning beams 13 that allows the motor 11's axle which is configured with an axial gear 111 to thread through the cover member 12. On an inner surface of the cover member 12, a pin 14 is configured beside the through hole and a transmission gear 15 is mounted axially so that it engages the axial gear 111. On an outer side of the transmission gear 15, there is an axle 17 and a spiral track 16 around the axle 17. As shown in FIG. 4, a valve assembly 18 has a nozzle 186 and a plug tube 185 pointing at opposite directions. A fastening ring 187 is plugged into the plug tube 185. The plug tube 185 and the fastening ring 187 are altogether fitted into a joining tube 20. The valve assembly 18 further has a channel 184 perpendicular to and connected to the plug tube 185 at one end. The other end of the channel 184 is an open end and is in the same space as the nozzle 186. A cover piece 183 is positioned in front of the open end of the channel 184. The cover piece 183 is joined to an end of a shaft 181 extending through a helical spring 182. The other end of the shaft 181 is connected to an end of a substantially L-shaped lever 19. A ring 191 at the other end of the lever 19 surrounds the axle 17 of the transmission gear 15. A pin 192 is extended from the rim of the ring 191 perpendicularly and is embedded in the spiral track 16.

Figure 9:
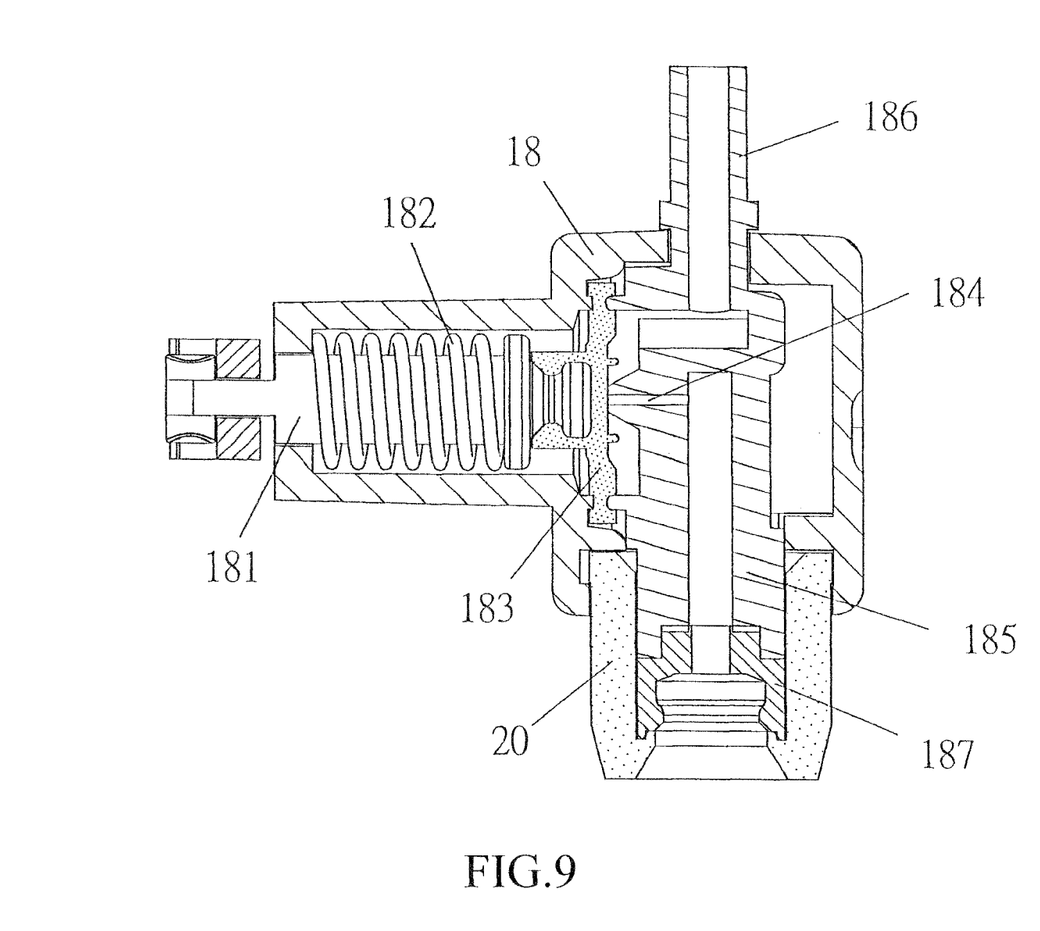
FIG. 9 is a partially sectional diagram showing the electrical valve control device and the sprayer of FIG. 8.

As shown in FIGS. 5 to 8, the electrical valve control device 1 is coupled to an aerosol sprayer 5 by having its joining tube 20 joined to a top end of the aerosol sprayer 5. After such connection, the aerosol sprayer 5 is opened but the aerosol inside does not leak due to the confinement of the channel 184, the fastening ring 187, and the cover piece 183. When the motor 11 is not activated, the lever 19 and the shaft 181 remain still, and the cover piece 183 seals the channel 184. After the motor 11 is activated, the axial gear 111 spins and engages the transmission gear 15. The lever 19's pin 192 is then driven along the spiral track 16. As the ring 191 moves downward, the shaft 181 is pulled backward and as such the cover piece 183 is moved away from the channel 184. Then, the plug tube 185, the channel 184, and the nozzle 186 jointly form a connected path, as shown in FIG. 9. The aerosol inside the aerosol sprayer 5 is as such released through the nozzle 186. The amount of aerosol released is dependent on how long the cover piece 183 opens the channel 184. As the lever 19's pin 192 continues to move along the spiral track 16, the ring 191 moves upward and pushes the shaft 181 forward. The channel 184 is then closed again by the cover piece 183 and the aerosol in the aerosol sprayer 5 is not released. As the motor 11 continues to run, the cover piece 183 opens and closes the channel 184 periodically and the aerosol in the aerosol sprayer 5 is released by a fixed amount intermittently.

Furthermore, the nozzle 186 can be plugged into an L-shaped tube 188 so as to alter the direction of the aerosol released.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An electrical valve control device, comprising:

a base member;

a cover member matched and joined to the base member;

a motor jointed to an outer surface of the cover member where the motor's axle is configured with an axial gear and extends through the cover member, a transmission gear having a track around its axle engages the axial gear; and a valve assembly having a nozzle and a plug tube pointing at opposite directions, a channel perpendicular to and connected to the plug tube at one end, a cover piece, a shaft, and a lever where the other end of the channel is an open end and is in the same space as the nozzle; the cover piece is positioned in front of the open end of the channel, the cover piece is joined to a first end of the shaft extending through a helical spring, a second end of the shaft is connected to a first end of the lever, and a pin is extended from the second end of the lever and is embedded in the transmission gear's track;

wherein the transmission gear drives the lever, which in turn engages the shaft, so that the cover piece is moved away from the channel.

2. The electrical valve control device according to claim 1, wherein the track on the transmission gear is a spiral track.

3. The electrical valve control device according to claim 1, wherein a ring is configured at the second end of the lever that surrounds the axle of the transmission gear.

4. The electrical valve control device according to claim 1, wherein a fastening ring is plugged into the plug tube, and the plug tube and the fastening ring are altogether threaded into a joining tube.

5. The electrical valve control device according to claim 1, wherein two positioning beams are extended from an outer surface of the cover member; each positioning beam has a hook at a top end; and the two positioning beams jointly fasten the motor to the outer surface of the cover member.

6. The electrical valve control device according to claim 1, wherein a pin is configured on an inner surface of the cover member for the axially mounting of the transmission gear.

7. The electrical valve control device according to claim 1, wherein two openings are configured on the cover and base members at corresponding locations, respectively, so as to allow the nozzle and the joining tube of the valve assembly to thread through.

8. The electrical valve control device according to claim 1, wherein the nozzle is configured with an L-shaped tube to alter the direction of spray.

* * * * *